July 20, 1954   O. M. ARNOLD   2,684,319
METHOD OF MAKING FABRIC
Original Filed March 31, 1944   2 Sheets-Sheet 1
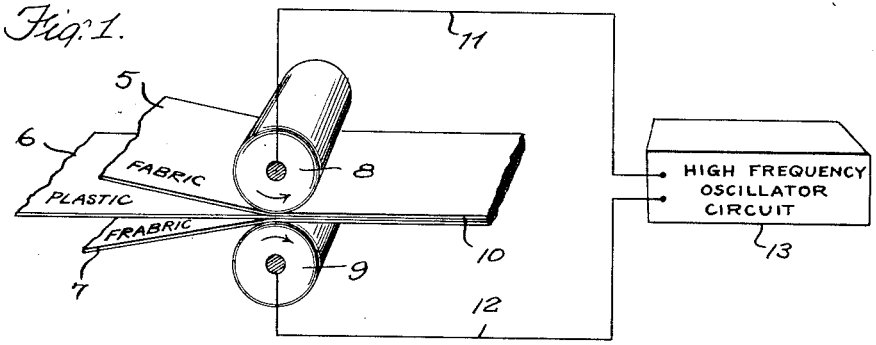
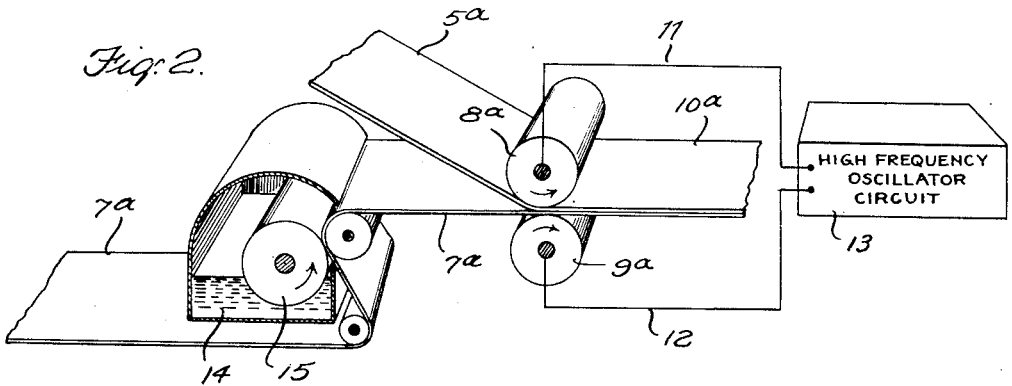
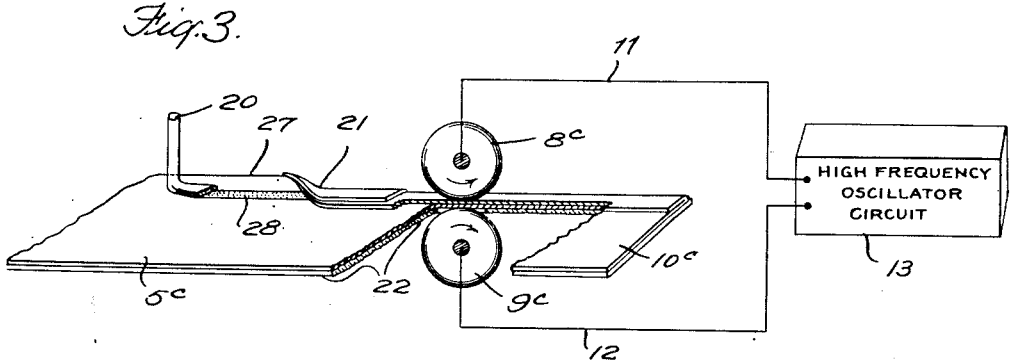
INVENTOR
ORLAN M. ARNOLD
BY
ATTORNEYS July 20, 1954  O. M. ARNOLD  2,684,319
METHOD OF MAKING FABRIC
Original Filed March 31, 1944
2 Sheets-Sheet 2
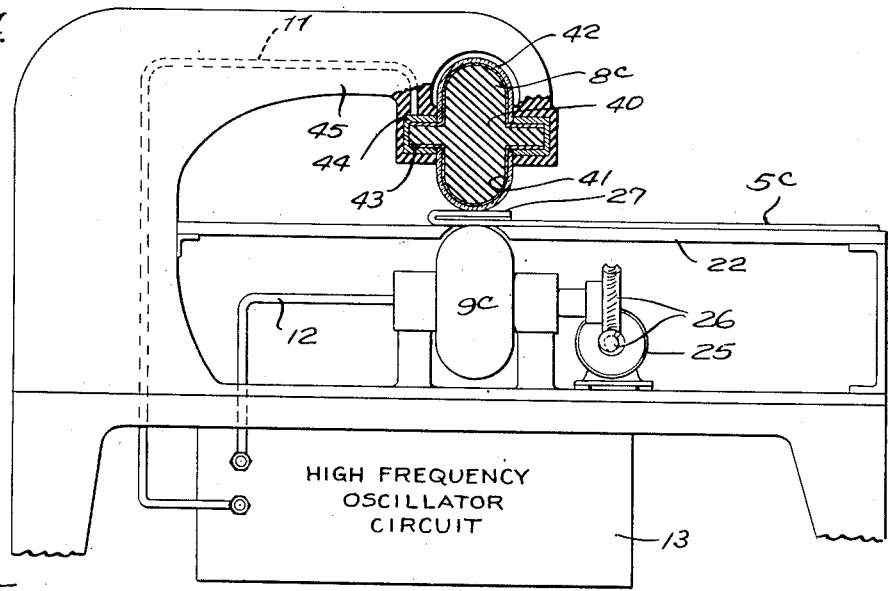
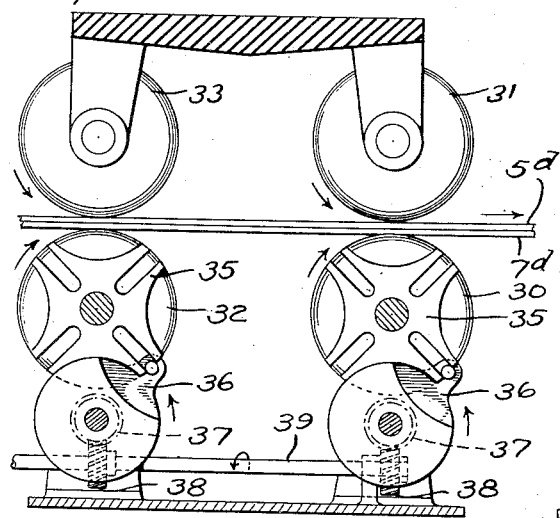
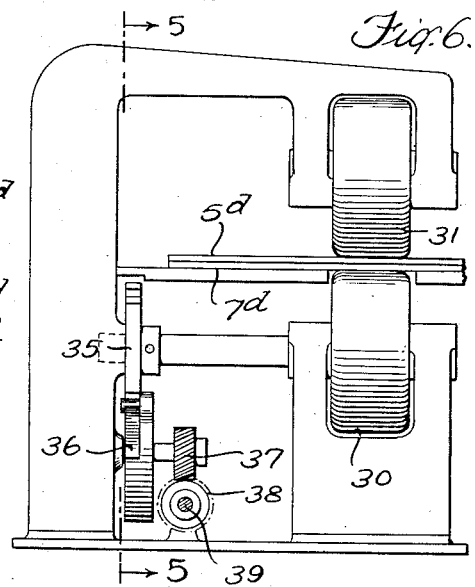
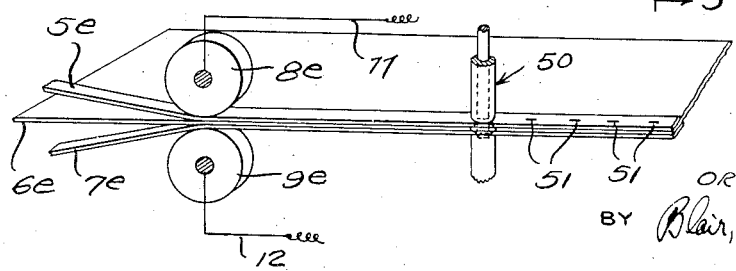
INVENTOR
ORLAN M. ARNOLD
BY Blair, Curtis + Hayward
ATTORNEYS Patented July 20, 1954

2,684,319

UNITED STATES PATENT OFFICE 2,684,319

METHOD OF MAKING FABRIC

Orlan M. Arnold, Grosse Pointe Park, Mich.

Original application March 31, 1944, Serial No. 528,855. Divided and this application May 21, 1951, Serial No. 227,320

1 Claim. (Cl. 154—101)

This invention relates to the art of seaming and laminating fabrics, and in its more specific aspects, to the uniting of layers of material.

A wide variety of types of weaving, felting and laminating procedures have been utilized in the past for production of various textile fabrics and fabricated articles. Among these are procedures utilizing fastenings of various kinds, such as stapling, stitching, riveting, etc. Other procedures utilize pressure and/or vibration without heat, depending generally on mechanical interlocking of fibers. Procedures of another type are those involving the use of adhesives or binders with or without heat and with or without pressure, as in the impregnation of fabrics by fused binders, and the cementing or glueing of parts. Another type of procedure involves the bonding of thermoplastic materials by conjoint use of heat and pressure, which in many instances destroys the character of the thermoplastic fabric, if fibrous, giving stiffer and denser products; and, even with solid sheets of plastic, causes deformation of the surface.

Suggestions have been made looking toward the use of high frequency electricity as the means for providing heat to soften uniformly throughout and render adhesive, plastic sheets which are to be laminated together, or thermoplastics which have been impregnated into materials which are to be laminated. There remains, however, a need for a simple, effective and easily controlled method of joining parts and especially for seaming textile fabrics without visibly affecting the exposed surfaces of the parts being joined or impairing their physical properties.

The present invention has as one of its objects the production of superior products having properties differing from those of ordinary products made by sewing, cementing or fusing.

Another object of the invention is to provide for bonding of fibrous materials in a sheet, strip, web or other fabric or between such webs for lamination so that distortion, deformation and weakening of the component fibers or layers of materials is minimized or avoided.

The invention also contemplates the provision of specific processes and apparatus for the efficient and effective provision of particular types of products under particular conditions.

The term "thermoplastic" is used herein to include materials which soften and set on heating as well as materials which soften on heating and solidify on cooling. The broader term "thermoactive" is used in some instances to cover in addition those materials which set without softening upon the application of a suitable degree of heat or of a high frequency current of such character as to cause an equivalent molecular agitation. The term "bonding agent" is used herein to include both materials which themselves form a bond and those which serve as thermoactivating or plasticizing agents to produce an adhesive temperature.

For a fuller understanding of the nature and objects of the invention reference should be had to the foregoing detailed description taken in connection with the accompanying drawings in which:

Figure 1 is a fragmentary schematic view exemplifying one mode of carrying out the invention with a thermoplastic bonding layer interposed between fabric layers;

Figure 2 is a fragmentary schematic view illustrating a modification of the procedure and apparatus of Figure 1, in which at least one of the fabric layers is thermoplastic and the separate bonding layer is omitted;

Figure 3 is a schematic view illustrating another mode of, and apparatus for, seaming fabrics by use of the invention;

Figure 4 is an end elevation, partly broken away and partly in section, of the apparatus used in Figure 3;

Figure 5 is a schematic cross sectional view of a further modification designed particularly for continuous spot welding of fabrics;

Figure 6 is a view similar to that of a fragment of Figure 4 but showing the modification of Figure 5; and Figure 7 is a schematic perspective view of another application of the invention, in this case for making of buttonholes and the like.

In Figure 1, layers 5, 6 and 7 are fed between rollers 8 and 9 which serve as high frequency electrodes for performing a bonding action. In the present instance, the outer layers 5 and 7 are of cloth or felt, such, for instance, as carpet and hairfelt, respectively, and the central layer 6 is a film of thermoplastic material which is non-adhesive under ordinary conditions, such for instance as cellulose acetate plasticized or coated with a plasticizer, e. g. triacetin.

While the invention in its broader aspect may be performed without pressure, the rollers in the present instance are arranged by suitable well known clamping means (not shown) to exert a light compacting pressure, e. g. of the order of one to ten pounds per square inch. The rollers 8, 9 serve primarily as electrodes whereby a high frequency field is set up, and to this end are connected by suitable conductors 11 and 12 to an oscillator circuit 13, such as is already well understood in the art of high frequency heating. The assembled sheets are moved at a speed such that they will be in this field for a short period, e. g. a fraction of a second to a few seconds, depending upon the power of the high-frequency circuit used and on the efficiency of the energy utilzation; or, in general, for a time sufficient to soften the film 6 of thermoplastic material and to render at least its surface adhesive without fusing or any substantial weakening, deforming or other deterioration of the fabrics 5 and 7. The resultant fabric is a carpet or rug carrying its own cushion integrally bonded thereto.

In some cases it may be desirable to utilize the thermoplastic sheet 6 in the final product, e. g. as a waterproof or windproof septum or a barrier against passage of dust, etc. To this end the thermoplastic layer is to be kept intact at its center while its surfaces are softened so as to embed and adhere to (or cohere with) the adjacent fibers of the layers 5 and 7. As one example of this the layer 6 may be run through a bath of plasticizer, and adherent plasticizer left on its surfaces. The treated surfaces then become softened and adhesive when subjected to conditions of treatment which do not soften or deteriorate the fabrics 5 and 7 or the interior of the sheet 6.

Although I refer to this bonding layer 6 as "thermoplastic," it may be only latently thermoplastic, i. e. it has substantially thermoplastic qualities under the given conditions only when treated with a plasticizing agent.

A further modification of this treatment, which is particularly useful where thin films or fibers of the thermoplastic are used, is to coat with the plasticizer only a part of the assembly which is not affected by it. Thus, if the fabrics 5 and 7 are made of non-plastic fibers, the opposed surfaces of these sheets may be treated with a plasticizer which, when it comes in contact with the bonding layer 6 during the high frequency treatment causes it to become adhesive at the point where adhesion is required. Since the film is not softened between these points, it remains intact even though of very thin stock.

This same principle may be utilized also in bonding a fabric of thermoplastic fibers to a fabric or other surface of a different material not softened by the same plasticizer. The plasticizer in such case may be applied, e. g., by dipping, spraying or brushing with a solution of the plasticizer, onto the non-plastic fabric where it will contact with the plastic fibers. Wherever such contact occurs, adhesion will be effected by the action of the plasticizer when exposed to the high frequency or other softening treatment; at all other places the fibers will remain substantially unaffected. After the high frequency treatment, excess plasticizer may be washed out.

This I have illustrated by the example shown diagrammatically in Figure 2 wherein a facing fabric, e. g. of celanese (acetate rayon) broadcloth, is shown at 5a and a backing, e. g., or cotton sateen, is shown at 7a. The latter has applied to its surface a coating of triacetin, e. g. as a 2%-4% solution in carbon tetrachloride, by the doctor roll 15 which runs in a bath of the solution contained in the tank 14.

When the solvent is evaporated and these fabrics are brought together between the rolls 8a and 9a under the influence of the high frequency field the acetate fiber is rendered adhesive wherever it touches a cotton fiber carrying the plasticizer, whereas the treatment is regulated so as not to soften substantially the remaining parts of the cellulose acetate fabric. The product 10a is a lined fabric suitable for making of fine drapes and the like and, although the fabrics are united throughout by a plastic bond, they are not objectionably stiffened or otherwise deteriorated.

This principle is applicable also to the production of bonded fiber fabrics. Thus, a viscose yarn may be coated with triacetin or other plasticizer of cellulose acetate and then be cross-woven with an acetate yarn. The resulting cloth, after treatment at the controlled temperature or high frequency as described above, will be bonded where the threads cross in the fabric, but will have lost nothing of its softness, silky sheen or smoothness.

Non-run kilt goods can be similarly made by including viscose or other non-plastic fiber coated with triacetin or other plasticizer with cellulose acetate or other thermoplastic fiber in the same thread or by knitting with several threads alternating between treated non-plastic and thermoplastic fibers. After treating the resulting knit goods at the elevated temperature or high frequency controlled to soften and render adhesive only that part of the thermoplastic which is in contact with the plasticizer, the threads are surface welded at the loops and therefore cannot slip through so as to produce a run, although they are still soft, flexible, and elastic.

Although I prefer to use high frequency because of its rapid effect and excellent possibilities for control, nevertheless it is an advantage of the use of plasticizer in the manner just described that it can be used with application of heat as such, either as radiant heat, by convection or even by conduction from hot rolls or pressing irons, although this last is usually not recommended since the fibrous materials are poor conductors and accurate control is difficult to attain. The temperature in any case is kept below that at which the acetate fibers without plasticizer would be substantially softened but above that at which they become adhesive in the presence of the plasticizer on the cotton fabric.

The procedures such as described in connection with Figure 1 are also particularly adapted for use in making semi-stiff fabrics such as are used for shirt collars, etc. In such case the cotton broadcloth or other shirt fabric layers may be brought together as at 5 and 7 in Figure 1 with an intermediate layer of thermoplastic, e. g. cellulose acetate, as at 6. The plasticizer in this case is advantageously carried on the opposed surfaces of the cotton cloths as just described above. Increased stiffness may be attained by increasing the pressure and/or the degree of fusion in the bight of the rolls 8—9.

Any desired number of layers may be utilized for various types of fabrics. All of these layers may be composed in whole or in part of thermoplastic materials. For example, the layers 5 and 7 (or 5a and 7a) may be woven acetate rayon or may contain cellulose acetate threads or fibers. Indeed all of the layers may be composed of mixtures of thermoplastic and non-thermoplastic fibers without departing from the invention in its broader aspects. If, however, certain of the layers are composed of non-thermoplastic material such for example as cotton, viscose, or cupra-ammonium thread any two such layers should have disposed therebetween a layer containing thermoplastic material. Any thermoplastic suitable for the requirements of the desired product and which is capable of being rendered adhesive to the adjoining layer may be used according to this invention. Commonly used fibers suitable for this purpose besides cellulose acetate include cellulose nitrate, vinyl salt and ester polymers (e. g. Vinyon), polyamides (e. g. nylon), glasses (e. g. Fiberglas), etc. Thermoplastics may also be used in film or sheet form, including cellulose esters, vinyl esters, salts and alcohol, acrylic type esters, especially methyl methacrylate, hydrocarbon polymers, e. g. styrenes, ethenes, etc.

Another type of lamination for which the invention is particularly well adapted is that of joining two sheets or two portions of one sheet together as in seaming, and especially hemming. There is shown in Figure 3, for example, a sheet 5c to be hemmed. This sheet may be of any textile or similar fabric or other sheet material. The edge 27 of the fabric to be hemmed is folded back in the usual manner as at 21 and the edge is then run between electrode rollers 8c and 9c which, like the rollers 8 and 9 are also electrodes of a high frequency circuit.

In the event that the sheet 5c contains no thermoplastic material, or insufficient thermoplastic material for effectuating a good bond between the two layers which have been disposed against each other by the folding of the hem, there is desirably inserted a thin strip 28 of thermoplastic material, which is softened by energy of the high frequency field set up between the electrodes 8c and 9c, thus forming an adhesive bond between the overlapping layer and the body of the sheet 5c. In instances where the sheet 5c is formed of or includes thermoplastic or thermoactive material, the strip 28 is not necessary, but it may be used to advantage if it is a material more receptive of the high frequency energy than the fabric 5c or if it is or carries a plasticizer so as to produce an adhesive condition well below the softening point of the thermoplastic in the sheet material 5c.

Such plasticizer may be supplied as indicated in Figure 3, for example, by the provision of a small jet 20 in advance of the hemmer appliance which forms the fold 21. If the plasticizer is in solution, a dryer may be provided between the jet and the hemmer appliance, or the jet 20 and the appliance may be sufficiently spaced to permit any necessary amount of drying. Instead of this jet, a solid plasticizer may be melted and spread or sprayed while hot or a solid plasticizer may be fed by suitable means in powdered form either alone or on a suitable carrier, e. g. a tape, or a plasticizer thermoplastic material may be provided in the form of a solution or of a powder or of a tape, for example.

If the thermoplastic fabric is cut at the edge which forms the hem and is then coated or saturated with plasticizer, e. g., by a treatment such as that at 28, and if the pressure of the rolls 8c, 9c is sufficient, the fibers in this edge will be bonded together at the same time they are seamed to the fabric at the edge of the hem.

The present process has the advantage that the surfaces to be bonded need not be in adhesive condition when the parts are brought together. If a solution is used, the solvent can be all evaporated before the material reaches the hemmer 21.

In the case illustrated in Figure 3, the rolls 8c and 9c, instead of having a length as great as the full width of the sheet, are substantially limited to the width of the bonded strip in the hem, a glass plate 22 being provided to support the body of the sheet 5c. This is shown more clearly in Figure 4, wherein the rolls 8c and 9c are mounted in a frame as shown, the lower roll 9c in this case being driven at fixed speed by a motor (indicated diagrammatically at 25) driving through the worm gear 26. The upper roll 8c in this case runs free. The rolls and their axles may be made of a refractory insulating material 40 such as Bakelite, isolantite, glass, etc., and covered with a toroidal metal facing 41 which serves as the electrode. This in turn is advantageously covered with a layer 42 of insulating material such as isolantite, glass, etc., to prevent excessive change in the circuit when the fabric runs out from between the rolls.

Contact to the rolls is made through the copper-graphite or other conductive bearing sleeve 43 and the metal bearing 44 molded into the insulating frame 45, through which also passes the conductor 11.

The apparatus shown in Figures 3 and 4 is adapted also for types of seaming operations other than hemming. Thus two fabric portions 27 and 5c may be united by this method and apparatus whether parts of the same piece as shown in Figure 3, or edges of different pieces, and in general this method and apparatus may be used wherever sewing or cementing has been used in the past.

In some cases it is preferable to "stitch" materials by a succession of spot welds rather than to make a continuous line weld as in Figures 3 and 4. The apparatus of Figures 5 and 6 has been designed for this purpose. Driving and pressure rolls 30, 31, 32, 33 engage the material along the seam (in which term I include hems, etc.) and drive the material forward step by step. The lower rolls 30, 32 are driven in unison by a Geneva gear drive 35, 36, 37, 38, 39 from a constant speed motor (not shown) whereby the timing of each weld is automatically determined. The periphery of the roll 30 is slightly greater than that of 32 so as to maintain the goods stretched between the rolls.

During each period of rest of the rolls the electrodes 8d, 9d are energized from the high frequency circuit (not shown). This circuit may be controlled by a timing switch and cam (not shown) connected to the drive 39 so that the electrodes are not energized during movement; or the electrodes can be continuously energized and the intensity of the treatment and speed of travel may be so regulated that welding occurs only on the longer exposure during the periods when the sheets 5d and 7d are stationary. This softening treatment continues until about the instant when the movement of the fabric is renewed, whereby the spot between the electrodes, still in an adhesive condition, passes under the press rolls 30—31 where it remains until cooled. If there should be any softening of the outer portion of the fabric during the high frequency treatment, this has an instant to cool in air and on the cool surfaces of the rolls 30, 31 before pressure is applied. Air jets or blast may be used to hasten this.

Instead of using the separate electrodes without pressure as just described, a stitching effect may also be secured by intermittent passage of high frequency with apparatus otherwise as shown in Figures 3 and 4 or 5 and 6 by using electrode inserts in the rollers which alloy passage of the high frequency only when they come together at the bight of the rolls or by using toroidal or disc electrodes and a timing switch for imposing intermittently the high frequency voltage.

In this manner sheets may be bound together without being merged throughout. For example, water-proof clothing formed of the product of such a procedure may have the texture of an interior cloth layer substantially unmodified by the bonds which unite this layer to an outer water-proof layer, and the product will in addition have much greater flexibility than would be the case if the two layers were bonded throughout.

In certain instances, the electrode rollers such as 8 and 9 and the similarly numbered rollers with varying letters may be provided with electrically active peripheries, but their use should be under such conditions that arcing and contact will not occur; and, since tendencies toward arcing increase as the voltage is increased, for greater effectiveness in most instances in accordance with the invention the rollers have a dielectric material such, for instance, as steatite, isolantite, or suitably bonded mica, at their peripheries by which the conductive electrodes are insulated.

This invention also provides a means whereby buttonholes may be simply and easily formed. As shown in Figure 7, for example, a sheet of cloth 6e of thermoplastic fibers may have tapes 5e and 7e applied to opposite sides thereof along the line of desired buttonholes. These may be strip welded or spot welded to the fabric 6e by running the assembly under electrode rollers 8e and 9e. Thereafter, the sheet is run under a slitting or punching apparatus 50 whereby a buttonhole slit is cut as shown at 51 in areas wherein the fibers have been welded by the high frequency treatment. If the rolls 8e, 9e operate under relatively high pressure the stiffness of the fabric 6e may be substantially increased in the area around the holes, or the added tapes 5e, 7e may be entirely relied upon to provide the desired character around the holes.

The sheet 6e may be formed of non-thermoplastic material such as cotton cloth and the applied tapes may be composed of thermoplastic material such as cellulose acetate rayon, or both may be thermoplastic or both non-plastic and a thermoplastic bonding tape interposed between them. It is also feasible to form buttonholes and the like in a single layer of thermoplastic textile by fusing together around the hole, to a greater or less extent, the fibers of the textile and punching as described above.

Although I have given above certain specific examples of my invention and its application in practical use and have given also certain modifications and alternatives, it should be understood that these are not intended to be exhaustive or to be limiting of the invention. On the contrary, I have given these as illustrations and have given explanations herein in order to acquaint others skilled in the art with my invention and the principles thereof and a suitable manner of its application in practical use, so that others skilled in the art may be enabled to modify the invention and to adapt it and apply it in numerous forms, each as may be best suited to the requirement of a particular use.

This application is a division of application Serial No. 528,855, filed March 31, 1944, now abandoned.

I claim:

The method of forming fabrics composed of bonded interlaced thermoplastic and non-thermoplastic fibers which comprises coating the non-thermoplastic fibers with a plasticizing agent for said thermoplastic fibers only, forming said fibers into a fabric defining spaced junctions of thermo-plastic and non-thermoplastic fibers, and subjecting the fibers to a high frequency electric field of such intensity and for such period of time that heat from the dielectric loss in said thermoplastic fibers is sufficient to fuse the thermoplastic fibers to said coated non-thermoplastic fibers at said junctions but insufficient to deform the remaining portions of said thermoplastic fibers.

References Cited in the file of this patent

UNITED STATES PATENTS

| Number | Name | Date |
|---|---|---|
| 2,476,282 | Castellan | July 19, 1949 |
| 2,476,283 | Castellan | July 19, 1949 |

FOREIGN PATENTS

| Number | Country | Date |
|---|---|---|
| 555,054 | Great Britain | Aug. 3, 1943 |

OTHER REFERENCES

Hoyler: An Electronic "Sewing Machine," reprint from the August 1943 issue of Electronics.